US011722520B2

(12) United States Patent
Hallaji et al.

(10) Patent No.: US 11,722,520 B2
(45) Date of Patent: Aug. 8, 2023

(54) SYSTEM AND METHOD FOR DETECTING PHISHING EVENTS

(71) Applicant: ROYAL BANK OF CANADA, Toronto (CA)

(72) Inventors: Matin Hallaji, Toronto (CA); Cheng Chen Liu, Toronto (CA); Ilya Kolmanovich, Toronto (CA); Jamie Robert Gamble, Toronto (CA); Gadi Shpits, Toronto (CA); Cormac O'Keeffe, Uxbridge (CA)

(73) Assignee: ROYAL BANK OF CANADA, Toronto (CA)

( * ) Notice: Subject to any disclaimer, the term of this patent is extended or adjusted under 35 U.S.C. 154(b) by 422 days.

(21) Appl. No.: 17/101,713

(22) Filed: Nov. 23, 2020

(65) Prior Publication Data

US 2021/0160281 A1    May 27, 2021

Related U.S. Application Data

(60) Provisional application No. 62/938,628, filed on Nov. 21, 2019.

(51) Int. Cl.
*H04L 9/40*     (2022.01)
*G06N 20/00*    (2019.01)

(52) U.S. Cl.
CPC ......... *H04L 63/1483* (2013.01); *G06N 20/00* (2019.01); *H04L 63/08* (2013.01); *H04L 63/10* (2013.01); *H04L 63/1425* (2013.01)

(58) Field of Classification Search
CPC . H04L 63/14; H04L 63/1408; H04L 63/1441; H04L 63/1483; H04L 63/1491
See application file for complete search history.

(56) References Cited

U.S. PATENT DOCUMENTS

| | | | |
|---|---|---|---|
| 8,839,369 B1* | 9/2014 | Dai | G06F 21/552 726/4 |
| 9,060,017 B2* | 6/2015 | Marion | H04L 63/1416 |
| 10,453,017 B1* | 10/2019 | Richards | G06F 16/285 |
| 10,764,313 B1* | 9/2020 | Mushtaq | G06N 20/00 |
| 11,316,895 B1* | 4/2022 | Wright | H04L 63/1491 |
| 11,470,113 B1* | 10/2022 | Orhan | H04L 63/1408 |
| 2007/0005984 A1* | 1/2007 | Florencio | H04L 9/3226 713/178 |
| 2007/0107053 A1* | 5/2007 | Shraim | H04L 63/1483 726/22 |

(Continued)

*Primary Examiner* — Khang Do
(74) *Attorney, Agent, or Firm* — Norton Rose Fulbright Canada LLP

(57) ABSTRACT

A system for detecting phishing events is provided. A data receiver is configured to receive datasets representative of web traffic associated with access to or on-going usage of an application hosted on a server of a production environment by a user. A machine learning engine is configured to generate a score based at least on the datasets representative of the web traffic indicative of whether the user is a malicious user or a non-malicious user. A routing modification engine is configured to route downstream web traffic associated with access to or on-going usage of the application by the user if the score is greater than a threshold to a server of a sandbox environment that is configured to emulate a graphic user interface of the production environment.

20 Claims, 8 Drawing Sheets

(56) References Cited

U.S. PATENT DOCUMENTS

| | | | |
|---|---|---|---|
| 2009/0228780 A1* | 9/2009 | McGeehan | G06F 21/55 726/4 |
| 2009/0241187 A1* | 9/2009 | Troyansky | H04L 63/1433 726/22 |
| 2009/0328216 A1* | 12/2009 | Rafalovich | H04L 63/1441 726/23 |
| 2011/0126289 A1* | 5/2011 | Yue | G06F 21/554 726/26 |
| 2013/0212658 A1* | 8/2013 | Amaya Calvo | H04L 63/083 726/6 |
| 2014/0041024 A1* | 2/2014 | Larkins | H04L 63/1483 726/22 |
| 2014/0215621 A1* | 7/2014 | Xaypanya | H04L 63/145 726/23 |
| 2017/0195346 A1* | 7/2017 | Be'Ery | H04L 63/10 |
| 2017/0244755 A1* | 8/2017 | Tsao | G06F 21/44 |
| 2018/0007066 A1* | 1/2018 | Goutal | H04L 63/1483 |
| 2020/0053120 A1* | 2/2020 | Wilcox | G06Q 10/107 |
| 2021/0099484 A1* | 4/2021 | Li | G06F 16/2255 |

* cited by examiner

SYSTEM AND METHOD FOR DETECTING PHISHING EVENTS

CROSS REFERENCE

This application is a non-provisional of, and claims all benefit, including priority to, U.S. Provisional Application No. 62/938,628, entitled SYSTEM AND METHOD FOR DETECTING PHISHING EVENTS, filed Nov. 21, 2019, incorporated herein by reference in its entirety.

FIELD

Embodiments of the present disclosure generally relate to the field of cybersecurity, and more specifically, embodiments relate to devices, systems and methods for detecting phishing events.

INTRODUCTION

Customers are being targeted by fraudsters with phishing emails and SMS messages.

Once the client falls victim to these attacks, the fraudster will use the credentials submitted by the client to defraud an institution. Financial institutions are able to detect a significant portion of the fraudulent transfers of funds from client accounts, but losses can be significant.

Cybersecurity is an important consideration, and mechanisms to detect phishing events are desirable to aid in fraud management and potentially event mitigation.

SUMMARY

Attempts for "baiting" phishing accounts manually have been utilized, for example, an ad-hoc basis. For example, "phish baiting" (submitting known bad credentials to a phishing site) can be done by hand. Other approaches include using ML/AI models to detect phishing sites using streams of public information (e.g., domain registration and SSL certificate data). The classification of sites using AI/ML is also something that is used in the industry. Essentially, for the classification, a ML/AI model will be built to detect a graphic (e.g. a company logo) within a screenshot of a website.

The solutions that each of the above are limited to solving specific problems and cannot be readily scaled. The problem is a matter of scale, in relation to performing this action across tens of thousands of sites effectively. The layout of each site can be different, but what is common is that the sites are adapted to dupe unsuspecting individuals to enter their information through mimicking the look and feel of a legitimate website, and then adding the maliciously obtained credentials into a database of credentials. The database of credentials can then be transferred or sold amongst different downstream malicious actors, who then use the credentials to log into the legitimate website (or other legitimate websites if the users had utilized the same or similar credentials across many websites.

Websites are described in examples herein, but it is important to note that websites are only one type of secured network resource that is contemplated. Mobile applications, network access credentials, active directory credentials, computer account credentials are also contemplated.

As described in some embodiments, systems, methods, devices and corresponding computer program products (e.g., non-transitory computer readable media storing machine-interpretable instructions) are contemplated that provide an automated mechanism that provides a technological solution in the form of a data process and corresponding systems, methods, and computer program products for automating interactions with malicious computing agents and their associated websites.

In particular, the computer system is configured for an automatic baiting process "dragnet process" of suspected malicious online resources (e.g., phishing websites) by generating bait confidential user credentials (e.g., client card numbers, names, addresses, social insurance numbers, phone numbers). The malicious online resources are automatically traversed to insert the bait confidential user credentials in corresponding input pages or fields. The bait confidential user credentials can be generated as payloads which include specific security aspects so that they are readily identifiable as bait credentials by the automatic baiting process. For example, a specific checksum can be utilized, or the bait credentials can be generated based on a seed. A checksum is useful as a set of mathematical operations (e.g., binary operations, parity checks, modulo operations) can be used to quickly validate the bait credentials.

In some embodiments, to further avoid detection, the checksum can be adapted across multiple fields (e.g., username/password, username/phone number, password/phone number, username/password/personal verification question 1), etc. Accordingly, in this example, only when the specific combination is input is readily verifiable by the legitimate website as being the bait credentials (e.g., the legitimate website always requests username/password/phone number), but it is more difficult for the malicious actors to detect the checksum hidden in the bait confidential user credentials.

After a period of time, when the bait confidential user credentials are utilized on a legitimate website or application (e.g., to log into an online banking platform), the malicious agent is identified and re-routed into a sandboxed computing instance (e.g., fake online banking platform) where a malicious interaction fingerprint dataset is generated from recorded characteristics of the interactions (pattern of page traversals, timing between interactions). The sandbox can be a testing server or a mirrored production instance, for example, and the routing can be conducted after the initial connection to the legitimate website or application such that the malicious agent process cannot observe from network traffic alone that it has been rerouted to a new IP address.

In some embodiments, the sandboxed computing instance allows for limited interactions, such as actual funds transfers up to a particular limit so that the interaction can be recorded without suspicion that the sandboxed computing instance is not the legitimate website or application.

The malicious interaction fingerprint dataset that is generated is a valuable tool for conducting investigations into other sessions ("unclassified sessions"). For example, the malicious interaction fingerprint dataset can then be used to automatically compare a set of on-going sessions and to classify them potentially as malicious or not. In a variant embodiment, a baseline user profile fingerprint dataset is also trained based on historical interactions with the user, and the baseline user profile fingerprint dataset and the malicious interaction fingerprint dataset are used to establish a spectrum that the unclassified session can be identified on. In a further embodiment, the baseline user profile fingerprint dataset is applied a weighting based on the length of stable history from the user (e.g., the weighting representing a proxy relating to how useful the baseline user profile fingerprint is).

The comparison with a baseline user profile fingerprint dataset and the malicious interaction fingerprint dataset can be conducted using machine learning data model architectures where the baseline user profile fingerprint dataset and the malicious interaction fingerprint represent various scores associated with input movements, sequencing, timing, etc., in some embodiments. In other embodiments, the baseline user profile fingerprint and the malicious interaction fingerprint dataset can also be represented as trained machine learning models that are trained over time (as opposed to individual features or values). A combination is also possible.

These machine learning data model architectures and mechanisms can be implemented, for example, using physical hardware components and devices at a data center which is adapted for phishing detection. A special purpose machine, such as a rack-mounted server appliance or a dedicated hardware circuit may be contemplated in some embodiments, the special purpose machine intercepting certain communications that are suspicious and modifying the routing of data packets accordingly.

As a non-limiting example, a user Jane may be easily fooled by malicious online resources, such as phishing websites, which attempt to fraudulently obtain the user's credentials (e.g. username, password, etc.). For example, Jane may use online banking, and a phishing website can mimic the appearance and behaviour of the login page of Jane's bank. If Jane were to input credentials into the malicious site, she may for example, fall victim to various forms of financial attack.

Fake user credentials can be input into these phishing websites to maintain record of the characteristics of the malicious attack for tracking purposes. The phishing websites can be obtained as a list, for example, by receiving a dataset of known phishing sites, or in another example, automatically traversing a collection of links from spoofed correspondence (e.g., spoofed emails). This gives a "fingerprint" of the attack, and may allow Jane's bank to track the attack and discover other victims of the same attack. As noted herein, the approach is adapted to reduce the effectiveness of phishing attacks against the institution, and over time this will result in the attacks targeting the financial institution becoming more expensive and less productive resulting in the fraudsters focusing more on other targets. Applicants have developed a working model of some embodiments that is being tested in internal environments.

As described in a first aspect, a system for detecting phishing attempts is described. The system includes computer memory operating in conjunction with a computer processor, the computer processor executing a machine-interpretable set of instructions representing a method for detecting phishing attempts.

The system and corresponding data process can be implemented in the form of software modules operating on computer hardware, or in some embodiments, a physical server or computing unit that is specifically adapted for conducting dragnet daemon process operations.

The system automatically is configured to automatically generate credential sets for traversal and insertion into a list of known phishing or spoofed websites (e.g., as automatically extracted from a reporting service or emails sent to a phishing@bank.com email address through a web form).

The system includes a dataset receiver configured for receiving credential datasets representative of access attempts by an unknown user. The credential datasets can include user names, emails, passwords, etc. In some embodiments, the credential datasets further include metadata generated by a malicious user fingerprinting machine learning engine indicative of a confidence score that the user is a malicious user. The credentials, in some cases, can include entered credentials on a website or a web application through input fields. The malicious user fingerprinting machine learning engine is trained to generate the confidence score based on detected patterns of behavior, for example, based on multiple attempts from a same or similar internet protocol address (IP address), sequential attempts (e.g., attacks that cycle through numbers or letters), a total number of attempts, dictionary-based attempt patterns, among others.

In some embodiments, the credential datasets include a reference database of intentionally seeded "bait" credentials, which can be credentials that have been intentionally distributed across repositories storing compromised account information. As noted earlier, a checksum or other type of identifiable data element can be inserted into bait credentials or combinations thereof for downstream validation. In some embodiments, the dataset receiver is also configured to receive datasets indicative of tracked activity, and metadata indicative of suspicious patterns of behaviour. The metadata indicative of suspicious patterns of behaviour can be tracked based on logged behavior, among others, and profile definitions of suspicious behavior patterns.

The system includes a routing engine configured for coupling with backend platforms, the routing engine modifying interactions between the users and the backend platforms. The connections can be routed differently based on indicators of suspicious behavior. The routing engine can be coupled to a production environment providing an application or platform, such as an online banking system requiring login.

A production environment is the actual system that are being provided in operation. Production environments include specific computer servers and/or physical computing devices that interact with data messages coming from users and provide access to the underlying systems and data storage. Accordingly, production environments need protection from malicious users as malicious access into production environments could lead to cybersecurity breaches and/or malicious actions being taken (e.g., a fraudster accessing an online banking backend pretending to be another user to initiate fraudulent wire transfers).

When suspicious credentials are used, or bait credentials are used, the routing engine can direct the flow of datasets indicative of interactions to a sandbox environment operating the same application or platform. The sandbox environment, can, for example, be a non-production mirrored environment, such as a test environment, a staging environment, a development environment, etc. These types of environments are adapted for different usages, and likely do not interact with the underlying customer data (e.g., the connections may not be present).

However, to provide testing functionality, in some cases, the non-production environment can have limited capabilities, for example, to be able to interact with dummy or test data that may resemble customer data but is actually a sanitized environment where interactions are mimicked for testing purposes. In some embodiments, the sandbox is an environment that is specially configured for mirroring the application or platform such that the interactions appear to be seamless and similar to those of the production environment, except that the interactions with external systems, or transactions generated through the interactions are modified to increase logging/tracking aspects.

A link can be established between the credentials that are used that are suspicious and events in logs (e.g., an identifier can be added as a data structure element, such as a column in a relational database), and linkages can be appended that identify other compromised accounts.

For example, in the sandbox environment, when the suspicious user traverses the pages, the user experience may not shift but a backend shift may occur. When a transaction is initiated (e.g., a data message indicating a request for an electronic funds transfer), the outgoing transaction message can be automatically mined such that identifying information can be obtained (e.g., target email address for an email money transfer, a bitcoin wallet address) among others, such that the identifying information can be placed on a blacklist or a list identified for further investigation.

In a further embodiment, when additional funds are sent to such an account on a production system, the production system may be configured to automatically enforce safeguards against the flagged account to either delay or to stop the transaction. For example, if the suspicious user sends money to a specific email address in an email money transfer that is occurring on the sandbox environment, and another user sends money to the same email address in an email money transfer that is occurring on the production environment, the transaction can be flagged, delayed, or blocked.

In some embodiments, the sandbox environment is coupled with a content generation subsystem which dynamically generates content for a fake user in the sandbox environment such that it prepopulates a fake history and a fake balance of the user. As the sandbox environment is navigated, information can be tracked relative to identifying the phishing attempt, for example, trying to determine which phishing kit was used, etc.

If correct credentials are used but in a suspicious way, a digital credential freeze could be utilized for the user and a fraud team could call the person.

In some embodiments, the sandbox environment is provided on segregated infrastructure in a separate data center decoupled from underlying financial information databases.

In some embodiments, the sandbox environment emulates the production environment, and identifiers, such as HTTP response headers, are modified such that it is more difficult for the malicious user to detect that a shift in routing to the sandbox environment.

In an embodiment, the set of the one or more bait confidential user credentials include at least a bait client card number, a bait username, a bait password, a bait address, and a bait contact information; and wherein the bait client card number is generated with a bait checksum such that the bait client card number is verifiable using the bait checksum when received in the new set of user credentials.

In an embodiment, the processor is configured to first establish a state or a province of the set of the bait confidential user credentials selected based on a probability that is proportional of a population of the state or the province relative to a population of a corresponding country to which the state or the province is within, and then using the state or the province, generate the bait address, the bait contact information. This is useful to generate a representative set that can utilized to obtain a good distribution of baited credentials into distribution.

In an embodiment, the set of the one or more bait confidential user credentials is associated with an internet protocol (IP) address generated to replicate a residential device originating communications from the state or the province, and the internet protocol (IP) address is mimicked for the automatic traversal of the one or more webpages of the malicious online resource. Mimicking IP addresses aids in preventing detection of the baiting process.

In an embodiment, the internet protocol (IP) address generated is unique per set of the one or more bait confidential user credentials such that where a malicious actor is controlling a set of malicious online resources, a same internet protocol (IP) address will not be used across more than one malicious resource of the set of malicious online resources.

In an embodiment, the malicious interaction fingerprint dataset includes at least one of a recorded sequence of webpage traversals, recorded input device inputs, recorded timing intervals between interactions with interactive web page elements, addresses or recipients of funds transfers.

In an embodiment, the malicious interaction fingerprint dataset is compared with the one or more unclassified interaction fingerprint datasets using a machine learning data architecture model.

In an embodiment, the one or more unclassified sessions are on-going, and wherein the processor is further configured to: close or invoke an updated challenge on all sessions of the one or more unclassified sessions classified as suspicious sessions; or wherein the one or more unclassified sessions have concluded, and wherein the processor is further configured to: terminate or flag all pending transactions associated with the sessions of the one or more unclassified sessions classified as suspicious sessions.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

As described in some embodiments, systems, methods, devices and corresponding computer program products (e.g., non-transitory computer readable media storing machine-interpretable instructions) are contemplated that provide an automated mechanism that provides a technological solution using machine learning data model architectures.

These computer processes, including machine learning data model architectures and mechanisms in some embodiments, can be implemented, for example, using physical hardware components and devices at a data center which is adapted for phishing detection. A special purpose machine, such as a rack-mounted server appliance or a dedicated hardware circuit may be contemplated in some embodiments, the special purpose machine intercepting certain communications that are suspicious and modifying the routing of data packets accordingly.

The instruction sets can be stored in the form of software modules which when executed by a processor cause the processor to implement a "dragnet" daemon data process that can include at least one of a baiting engine provided by an external orchestrator engine to obtain malicious fingerprints after setting out bait credentials into the "wild" and an auto-investigator engine, which then is used to classify sessions based on the malicious fingerprints. As noted herein, the approach is an automated data process that is adapted to reduce the effectiveness of phishing attacks against the institution, and over time this will result in the attacks targeting the institution (e.g., a financial institution) becoming more expensive and less productive resulting in the fraudsters focusing more on other targets.

Two approaches may be taken to protect users or clients from phishing attacks, a reactive approach and a proactive approach. In a reactive approach, the client has already fallen victim to the phishing and in most cases a financial loss has already taken place. To prevent this, one may take a proactive approach. To achieve this, Applicants have proposed an automated application that, in some embodiments, comprises the two main component engines: an automated baiting mechanism and an automated detection and investigation module. The modules can be implemented in the form of computer programming instruction sets stored on non-transitory computer readable memory implemented on computer processing hardware, such as microprocessors and integrated circuit boards. The main component engines can be implemented separately or together (e.g., a first data process can be assigned the task of obtaining and maintaining a library of malicious agent fingerprint datasets for future matching, and a second data process can be obtained to provide vigilance over a subset or all of the sessions currently active or active in the past for a particular secured online resource.

Figure 1:
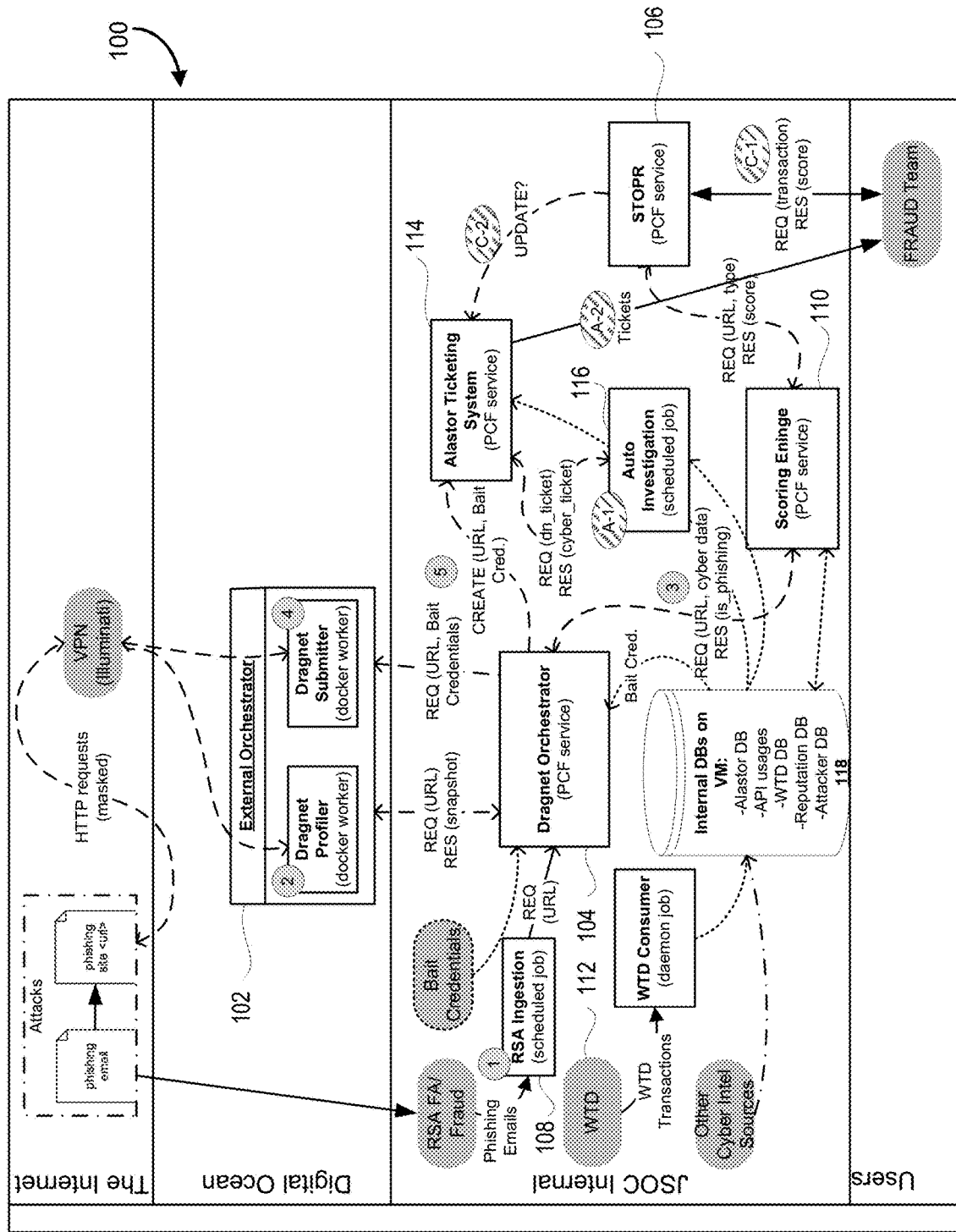
FIG. 1 is an architecture diagram of an example system for detecting phishing events, according to some embodiments.

FIG. 1 is an architecture diagram of an example system for detecting phishing events, according to some embodiments.

The system 100 shown in FIG. 1 is a non-limiting example of the components of the system, and there may be different, alternate, more, or less components. The components are implemented by way of computing devices, including hardware and software operating in conjunction with computer processors and computer memory. The computer processor executes a machine-interpretable set of instructions implementing a method for detecting phishing attempts.

With the system 100, live phishing websites that are targeting the organization are proactively identified and an automated bait is planted for them in forms of credentials of a fake victim by directly traversing the phishing websites and automatically seeding bait credentials. Phishing websites can be identified, for example, from phishing emails or phishing website databases and ingested as a scheduled job to automate the traversal of phishing websites (e.g., malicious websites) and bait credentials.

A detection module (e.g., a network traffic monitoring process) is coupled to a legitimate website and configured to monitor network traffic channels to detect the use of the bait credentials. Upon detection of the bait credentials, the threat actor is fingerprinted through observing the actions of the threat actor and the infrastructure that is used by said threat actor can also be added to the fingerprint. Fingerprinting may involve tracking features such as geo-location, device operating system (OS), browser version, language, http accept, among others. In some embodiments, the fingerprint is a data structure representing a machine learning architecture that is trained as a classified threat actor interoperates with either a legitimate website or a sandboxed version of a website.

For example, if a site was reported as a phishing site, posing as a fake financial institution, the system may be configured to first confirm that the site is a fake phishing site. This may be done by ingesting the active phishing URLs from a phishing take-down vendor, who may be responsible for validating that the site is indeed malicious. Other sources of phishing site identifiers can include automatic extraction from emails or webforms sent to an email, such as phishing@bank.com.

Credentials may then be provided into the malicious site, which may be done by generating client cards known to be non existing, as their check sum is invalid, and submitting these credentials directly to the phish mimicking real victim behaviour. The password and PVQ answers are pre-generated, to mimic the look and feel of a legitimate user's information.

During automatic traversal of the malicious site, site elements can be analyzed to identify input fields, and corresponding bait credentials can be entered, for example, using HTML GET/POST responses, among others. Additional approaches for perturbation may be utilized (e.g., adding timing jitter to entry/page traversal) to try to avoid detection of the automatic traversal of the malicious site by the dragnet daemon process.

In some embodiments, PVQ answers may be created by generating random names in real time, per request. It may be assumed that a random name can be considered a valid answer to most PVQ questions.

This approach provides two advantages: First, this information may be used as "known bad" and subsequent attempts to access other accounts by the same actor can be blocked. This will cut the actor's access to other real victim's accounts. Second, the historical data may be investigated to identify accounts that were accessed by the same actor and mark them as compromised, which potentially saves further financial losses.

The system may include an external orchestrator 102 (e.g., external orchestrator or an ingestion mechanism) that is configured for communicating bait credential datasets representing a fake legitimate user to various phishing websites. The credential datasets can include user names, emails, passwords, etc. In some embodiments, the credential datasets further include metadata generated by a malicious user fingerprinting machine learning engine indicative of a confidence score that the user is a malicious user.

In order to effectively bait the phishing website, a smart forged data generator may provided as part of external orchestrator 102 be used to generate data that looks like that of a real victim, when observed by a threat actor. The forged data may use a combination of randomly generated names, dates, and common passwords from a database. In some embodiments, a first and last name may be randomly created. The system may then randomly chose a province with a probability proportional to the population of provinces. Then, based on the province, the system may generate a phone number, SIN number, driver's license number, etc. A mother's maiden name may be assigned randomly. The account number may also be random, ensuring that it is not a valid number.

In some embodiments, the tuple or the data structure representing the bait confidential user credentials includes data elements which individually or in combination relate to a particular checksum or other type of identification element that can derived from the data. For example, fake client card numbers or social insurance numbers may be generated such that after a set of mathematical equations, the fake client card numbers or social insurance numbers can immediately be identified as likely bait credentials. For example, a modification of the Luhn approach can be utilized to generate fake credentials that can be quickly verified. An ability for quick verification can be important when used at scale and when real or near-time analyses are useful (e.g., when classifying a new session or on-going sessions quickly enough to take action to disable them or route them into a sandbox).

Checksums can be established across combinations of credentials to avoid sowing suspicion (e.g., if all bait passwords have the same parity check, if this is detected, the malicious agent will discard all of the accounts associated with the bait passwords). Where multiple credentials are used together to create checksums, it becomes more difficult to detect. For example, a checksum can be created based on a concatenation of a password, phone number, and a first personal verification question. The checksum can include, for example, a parity bit, a modulo remainder, among others.

Other types of operations can be added first to create a chain of operations needed to verify the checksum (e.g., MD5 hash+salt "AAA" twice, then conduct a mod 5 operation against the binary equivalent of the concatenation). The checksum can be dynamically set by the dragnet orchestrator 104 so that different sets of bait credentials have different checksum properties to further obfuscate the bait credentials.

A bait fake user profile may be given a fake identity by generating a first name, last name, province of residence, SIN number, driver's license number, account number, password, mother's maiden name, etc. When the system begins baiting, as it goes through different pages in the phishing website, it may use the data from this fake user to provide information to different pages, such as the login page (username and password), PVQs, personal information page, etc. This will help prevent a threat actor from recognizing the bait from a real victim. As mentioned, the generation need not be random as checksums can be utilized for reduced complexity in downstream verification (which is an important consideration as, for example, the validation process should ideally practically slow down a log in process for online banking to avoid impacting the customer experience).

The external orchestrator 102 receives datasets, for example, from extracted phishing emails or phishing website repositories, and is adapted for automatic traversal of the phishing websites and identification of input fields. In some embodiments, the external orchestrator 102 is configured to conduct similarity analysis to ensure that the phishing websites are relating to a particular application or organization (e.g., a specific fake online banking website that is used to fool customers of a particular bank). In this embodiment, similarity analysis is useful where a more targeted baiting operation is implemented, directed only to phishing sites that are directly attempting to emulate the target legitimate website.

A similarity analysis can be conducted, for example, through an automated web element analysis where, in some embodiments, images (e.g., logos) available on the phishing site can be compared against images of the legitimate site and if there is a sufficient match, the site can be flagged as a phishing site for automated baiting. In another embodiment, the web address itself is considered for similarity (e.g., www.banka.com/login, as compared to www.banka.co/login), and if there are sufficient proportions of characters similar (e.g., at least 75% of the characters are the same), it can be flagged for an automated baiting job.

In some embodiments, the external orchestrator 102 schedules multiple baiting attempts to seed multiple credentials into a target phishing website. In these embodiments, the external orchestrator 102 may be configured to continually use different IP addresses to avoid suspicion.

During traversals of the phishing websites, external orchestrator 102 may be configured to mimic other web traffic characteristics associated with communications with the malicious website. For example, IP addresses may be intentionally spoofed or hidden for improved fidelity to a fake location associated with a particular fake user represented by the bait credentials. Spoofing an IP address may include the specific utilization and selection of a virtual private network that utilizes specific IP addresses, or in other embodiments, modifying packet header information directly to change a source address in a packet header, for example. Similarly, in some embodiments, MAC addresses can also be spoofed to aid in camouflaging the source of the web traffic. The IP addresses can be spoofed or selected based on the location or region corresponding fake profile. A collection of spoofed IP addresses can be pre-generated and selected from when generating the bait credential profiles. In some embodiments, known address blocks of IP addresses that correspond to specific corporate IP addresses can be avoided to reduce suspicion.

Other characteristics include perturbing the speed of traversal (e.g., adding a random timer to the time between different page openings and character inputs), and in some embodiments, even the speed of individual character inputs and simulated mouse movements can be modified. This is particularly important where multiple bait credentials are being used for the same or related phishing sites.

In embodiment, an entire set of fake credentials are generated corresponding to a fake population set. In this embodiment, the set of the bait confidential user credentials can be established to represent various populations through establishing a probability of generation based on a proportion of population of a region relative to a country as a whole, which aids in generating a useful distribution of potential attacks across a geographic span of possible fake customers.

A dragnet orchestrator engine 104 may be configured to orchestrate and maintain routing decisions as between a production environment (e.g., online banking system), and a sandbox environment (e.g., a fake online banking system). The dragnet orchestrator engine 104 can operate as a pivotal cloud factory (PCF) architecture based component, where in some embodiments, the system may host applications internally on this cloud solution.

Upon receipt of a new session on a production instance of a legitimate website (e.g., a secure online resource), the credentials utilized for the new session are first analyzed. The credentials can include client card numbers, user names, passwords, addresses, personal verification questions, among others, and the input credentials can be automatically analyzed to determine whether the bait credentials were used. In some embodiments, a baseline threshold of a credentials are needed to be used before a particular new session is flagged as a malicious actor session.

Flagging a malicious actor session may include changing a particular Boolean variable or other metadata associated with the session. Where the system is implemented at scale, the validation of inputs can lead to technical bottlenecks that could impact the customer experience. Accordingly, in embodiments where checksums (such as using Luhn's algorithm) can be utilized in the bait credentials, a scalable and automatic validation approach can be implemented.

In another embodiment, instead of flagging with a Boolean, a particular session can be associated with an ongoing suspicion level. As more bait credentials are used, the suspicion level can increase. This for example, is useful when, a particular bait credential is not indicative on its own of a malicious agent session. For example, this can be related to particular names which are not unique, and the combination of the names with other elements such as addresses, phone numbers and area codes, or personal verification question answers is suggestive of a malicious agent. Conversely, certain bait credentials can it be associated with an automatic flagging of a session. These bait credentials for example could include bait client card numbers, bait social insurance numbers, or bait account numbers. A name which is very likely to be unique, in some embodiments, can also be a bait credential that is associated with an absolute automatic flagging. On the other hand, a name such as "John Smith" may only be coupled with a suspicion score contribution, which can be increased if used with the phone number 619-590-3444, and further increased with the zip code 10080 and accessing from a Brazilian IP address.

The dragnet orchestrator 104, in some embodiments is configured to receive modified data structures of account access credentials or event logs (e.g., of on-going access events) that may be appended with additional metadata to indicate a suspicion level (e.g., as established by the scoring engine). The credentials, in some cases, can include entered credentials on a website or a web application through input fields, and these may be ingested the dragnet orchestrator 104 that can operate as a malicious user fingerprinting machine learning engine that is trained to generate, in conjunction with a scoring engine 110, the confidence score based on detected patterns of behavior. The suspicion/confidence score may be, for example, based on multiple attempts from a same or similar internet protocol address (IP address), sequential attempts (e.g., attacks that cycle through numbers or letters), a total number of attempts, dictionary-based attempt patterns, among others.

An API Gateway, noted as STOPR 106 in FIG. 1, may be configured to provide services to users, and/or to communicate internal system findings with a backend fraud team or devices, for example. In some embodiments, suspicion score is also derived from tracked network traffic characteristics. For example, if a session purports to be from Canada, but the characteristics of the traffic indicate that the session may be sourced from Ukraine, the session may be associated with an increased suspicion level, which may be reflected in metadata associated with the session.

The web threat detect (WTD) engine 112 may, in some embodiments, be configured to monitor the web traffic. This information may be used to write rules, for example, certain traffic originates from a certain IP, and it may contain a certain device ID. System 100 may also perform various checks, such as a bait check and/or a sum check in WTD 112.

Alastor Ticketing System 114 is a ticketing system which may be used to maintain record of information sent by system 100, such as bait credentials. Auto investigator 116 may be configured to go through the tickets created by ticketing system 114, perform an investigation and close the tickets when finished. When it particular session is flagged as a malicious actor session, for example through the suspicion score in greater than a predefined threshold, or a Boolean flag being applied, and automated ticket may be established which then can be utilized by the auto investigator 116 engine to automatically modify how the malicious actor session is handled by the system.

When a malicious actor session is identified, in some embodiments, the malicious actor session is rerouted to an alternate environment such as a non-production environment or a sandbox environment where the malicious actor session is able to continue interacting with various webpage elements, which appear to be the same as a legitimate interaction, but are in fact operating in an alternate environment where a malicious interaction fingerprint dataset is being developed. The malicious interaction finger print dataset, in some embodiments, is a set of features such as sequences of interactions stored as an array or a linked list, the timing between various types of interactions, the timing between various types of input characteristics (such as keyboard strokes), among others.

The malicious interaction fingerprint dataset, and another embodiment, can be initiated as an untrained machine learning model which is trained over a period of time during the malicious interactions in the alternate environment. Accordingly, a template of features or a template machine learning model can be established based on the malicious interactions. In some embodiments, the alternate environment is configured for limited transactions to occur for example, a maximum funds transfer amount to particular recipients. The reason for this is that the recipient list can then be used and appended to the malicious interaction fingerprint dataset.

Internal databases 118 may include a reputation database and an attacker database. These can be both configured as both negative databases, in which the attacker database may maintain record of attacker fingerprints and the like, and the reputation database may similarly maintain reputation of certain IPs, certain device IDs and the like. The reputation database can be tracked then to modify suspicion scores associated with these particular technical characteristics.

The attacker database, on the other hand, may store the malicious interaction fingerprint datasets, which can then be used for various types of matching in the future. The attacker database, and store multiple malicious interaction fingerprint datasets which can all then be compared against unclassified sessions so that, for example, a 1:n matching attempt can be conducted whenever new credentials are encountered. In some cases, there may be so many malicious interaction fingerprint datasets that only a 1:m (subset of recent fingerprint datasets m is utilized for a real or near-real time analysis, and then in a batch process (e.g., overnight, once every week, quarterly), is then run against an expanded set (e.g., all 1:n malicious agent fingerprint datasets).

The process of submitting credentials to the phishing sites can be modified, in accordance with some embodiments. The following summarizes the flow for both how one can submit credentials and enhancements that are provided in a variation of the embodiment.

In an embodiment, upon receiving a potential phishing URL, the system 100 performs an analysis of the URL to determine if the system is able recognize the URI (path) portion of the URL.

If so, the system 100 checks a database to determine if the URL is for the login page, and if not, the system 100 determines whether there is a stored list of potential login pages that might correspond with the phishing kit being used.

The dragnet orchestrator 104 of the system 100 may be configured to then load (e.g., visit) the URL that may be first flow of pages through the link. The system 100 then parses the output in an attempt to validate that the page is for the institution being protected by system 100 and not another institution. In some embodiments, system 100 undertakes this by analyzing the content of the page, de-obfuscating it as needed, and/or using machine learning or artificial intelligence to classify the images on the page (e.g., look for the institution's logo) or the rendered page.

If the page does not appear to be a login form and/or an page associated with the institution, the system 100 is adapted in some embodiments to crawl the URL to determine whether there is a login page that is likely related to the institution (e.g., the system 100 can be configured to avoid submitting credentials to another institution's login pages). This is useful when there are a large number of phishing sites that may be bait credential targets and an automatic reduction of the list is useful to conserve computing resources.

When analyzing the password page, the system 100 needs to identify the password forms. Malicious users attempt to make the identification harder, such as using incomplete HTML or forms that do not appear to be password related. The system 100 has to identify the password submission form by using techniques such as a database of possible combinations, using machine learning/artificial intelligence models to predict if a form is a password form, comparing the form to the other forms and content on the page, among others.

Phishing sites may have a multi-page flow where different information is requested. One of the problems encountered is that the system 100 may need the data submitted to be consistent across each of the pages. Furthermore, it can be difficult to predict what content will be requested on each page.

To determine what content is being requested on a secondary page (e.g. answers to personal validation questions (PVQ), SIN number, etc.), the system 100 of some embodiments generates a fingerprint data structure representative of the phishing kit being used (or estimated to be used) and then the system 100 reference a saved template for the phishing kit. Alternatively, system 100 can be adapted to guess what each form is looking for by performing a word analysis (either using regular expressions or AI/ML models) on the text preceding the form.

A data model (based on a fake user profile) is built for a fake user that includes the user's credentials along with all of the information which might be requested by a phishing site. Examples would include a fake SIN number, driver's licensee, answers to fake PVQ questions, etc. The data may use a combination of randomly generated names, dates, and common passwords from a database. In some embodiments, a first and last name may be randomly created. The system may then randomly chose a province with a probability proportional to the population of provinces. Then, based on the province, the system may generate a phone number, SIN number, driver's license number, etc. A mother's maiden name may be assigned randomly. The account number may also be random, ensuring that it is not a valid number.

When fake accounts are created, the generated passwords are not overly sophisticated. For example, generated passwords may be simple, such as "summer123". This is because people with simple passwords are typically less technically inclined, and more likely to fall victim to phishing attacks because they may click on any link. Accordingly, some embodiments, a password or a credential generation engine can be deliberately configured to generate very simple passwords such as combinations of common words with numbers at the end, or commonly used combinations of symbols.

The dragnet orchestrator 104 is adapted to ensure that the content is consistent for the user. For example, if the home address of the user is in Montreal, the dragnet orchestrator controls the interface ensure that the address information is there, and that identifiable information that contains location data (e.g., driver's license, SIN number, telephone number) are all created so that they all contain the same geographical reference points. Accordingly, through each page of the phishing flow, the fake data is consistent with the fake profile is submitted as requested.

Figure 2A:
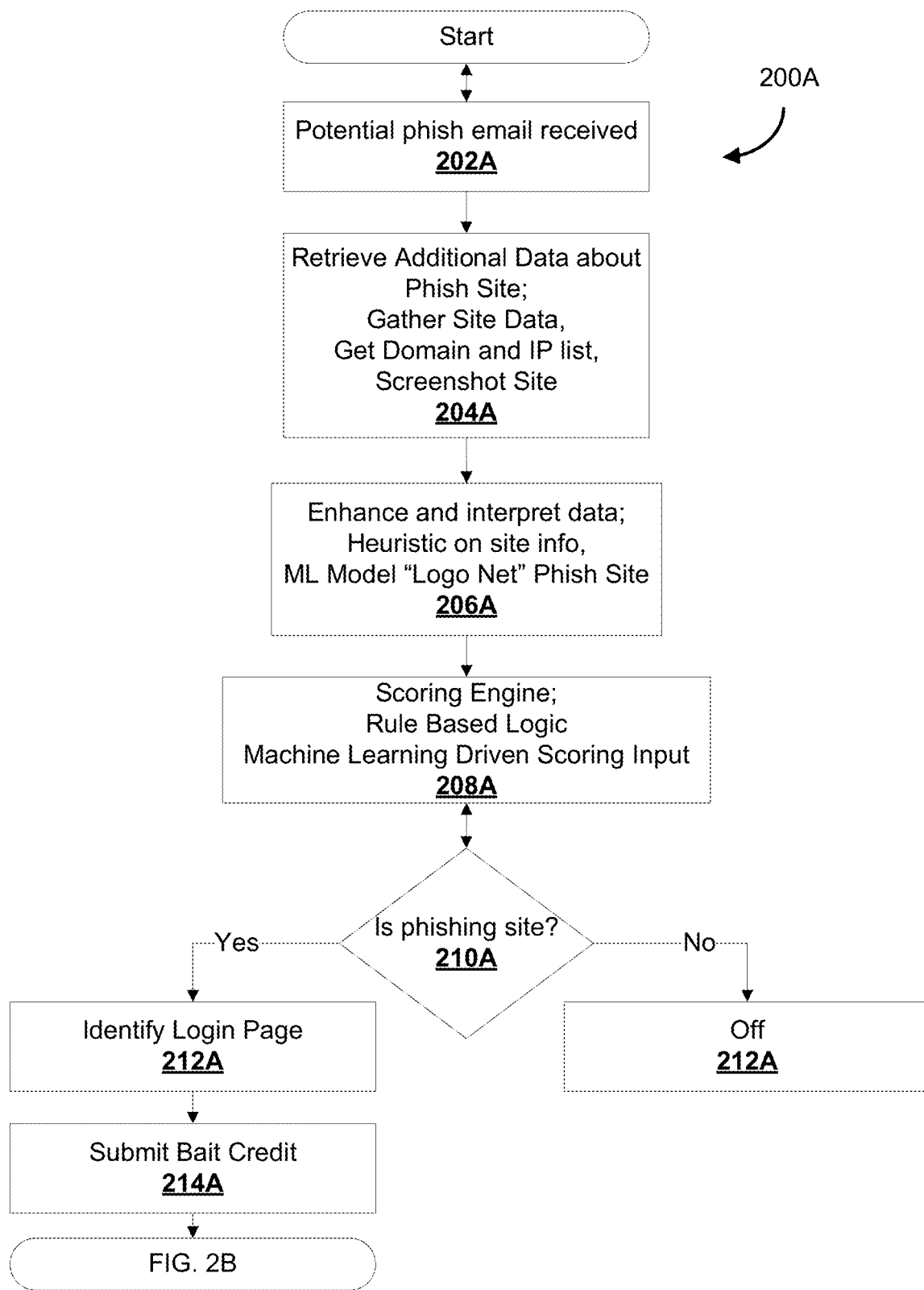
FIG. 2A is a method diagram of an example process for receiving credentials and marking them for investigation, according to some embodiments.

FIG. 2A is a method diagram of an example process for receiving credentials and marking them for investigation, according to some embodiments.

In method 200A, several layers of determinations are used to filter and identify malicious access attempts, which can be used for determining actions undertaken by the dragnet orchestrator of FIG. 1. The credential datasets can include a reference database of intentionally seeded "bait" credentials, which can be credentials that have been intentionally distributed across repositories storing compromised account information. In some embodiments, a dataset receiver may be also configured to receive datasets indicative of tracked activity, and metadata indicative of suspicious patterns of behaviour.

The metadata indicative of suspicious patterns of behaviour can be tracked based on logged behavior, among others, and profile definitions of suspicious behavior patterns. For example, emails sent by clients to a phishing mailbox in 202A, and websites identified by third parties, and data science models can be used to identify potential phishing websites and to populate the reference database.

Once a potential phishing website has been identified, the website address (URL) is sent to an externally hosted server. The system may then in 204A programmatically visit the potential phishing website and take a screenshot, and then download the available content (e.g., web page, images, and other content such as scripts, and potentially online banking (OLB credentials, etc.)) from it (hereinafter, such process is referred to as a "download").

Tools can be utilized to analyze the retrieved content and identify indicators that the site is impersonating another website, shown in 206A. Techniques such as identification of trademark logos in the screenshot and the use or metadata/heuristics can be applied to identify phishing sites.

The dragnet orchestrator 104 is configured for coupling with backend platforms (such as a production environment and a sandbox environment). The dragnet orchestrator 104 includes a routing control engine modifying interactions between the users and the backend platforms. The connections can be routed differently based on indicators of suspicious behavior, which may be found by a scoring engine in 208A and appropriate course of action determined in 210A. In 212A a login page of the phishing site may be identified, or the system process may end if no phishing site was previously detected. System 100 may then submit bait credentials to the identified login page in 214A.

Rerouting, can include rerouting connections while using the legitimate website as a first proxy so that from the perspective of the malicious actor process, the malicious actor process is still interacting with an IP address that still appears to be legitimate website. As an example, it may be important not to abruptly change the IP address being associated with the interaction, which may give away the rerouting of the session. In another embodiment, instead of rerouting the session to a sandbox environment, the session is simply flagged and the secured resource is configured to handle different transaction or interaction requests differently. For example, funds transfers requested when the session is flagged can simply be disabled or, in a more sophisticated example, may limited to allow for certain transactions to occur to as not to raise suspicions, but certain transactions above a certain size should not be allowed.

Figure 2B:
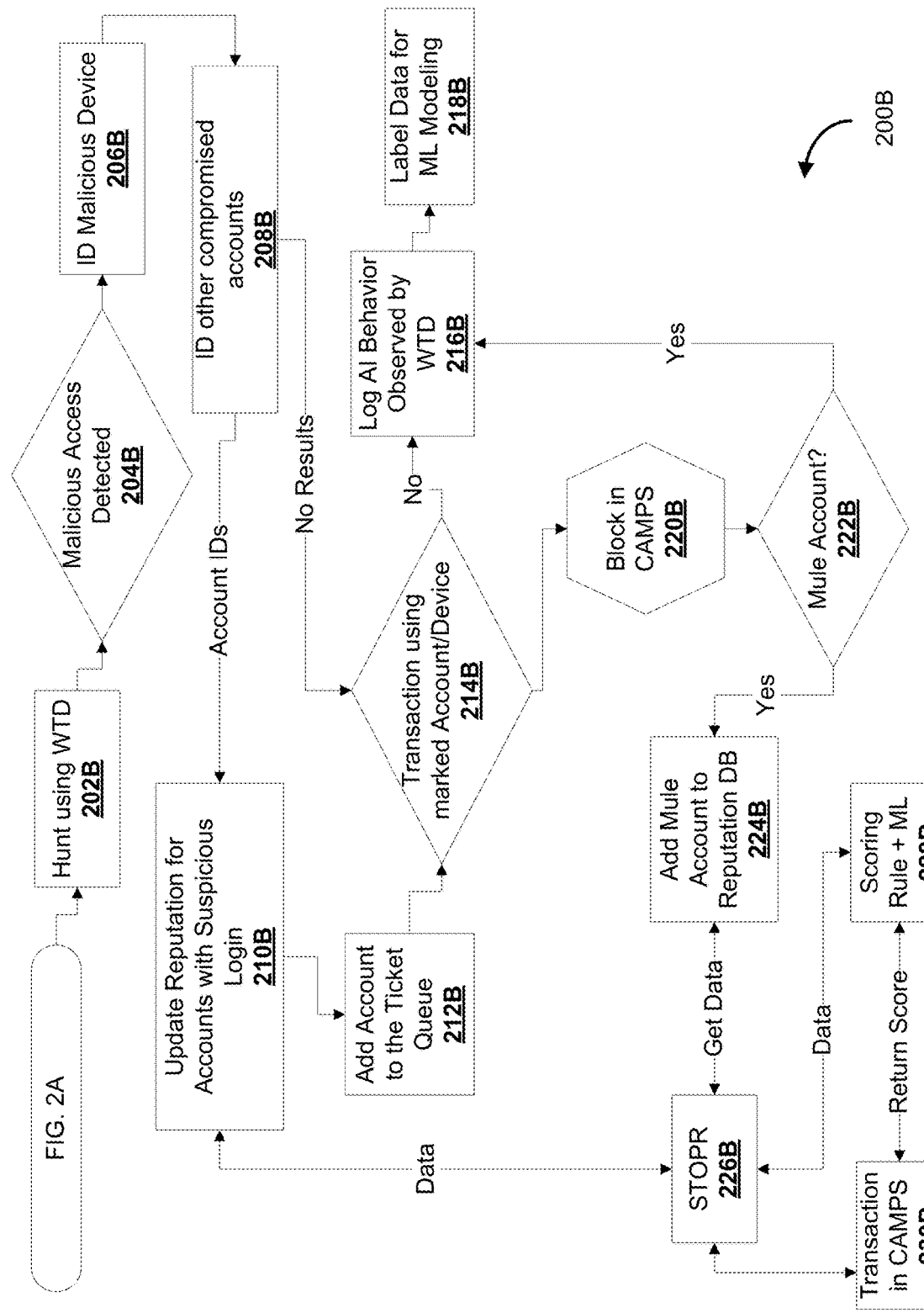
FIG. 2B is a continuation of method diagram FIG. 2A, of an example process for receiving credentials and marking them for investigation, according to some embodiments.

FIG. 2B is a continuation of method diagram FIG. 2A, of an example process for receiving credentials and marking them for investigation or fingerprinting, according to some embodiments.

In method 200B, which in some embodiments follows method 200A, several layers of determinations are used to filter and identify malicious access attempts, which can be used for determining actions undertaken by the dragnet orchestrator of FIG. 1. A "hunt process" may be performed using WTD in 202B, such as WTD 112, which may be configured to monitor online banking activity, and may track online banking traffic for the system. Once malicious activity is detected in 204B, the system may ID the malicious device in 206B, as well as other compromised accounts in 208B.

If account IDs are detected and identified in step 208B, the reputation may be updated in 210B for accounts with suspicious login, for example, in a reputation database. In 212B the ticket may be added to the ticket queue, using Alastor Ticketing System 114, for example. System 100 may then determine if the transaction was using a marked account and/or a marked device in 214B. Had there been no results following step 208B, the system may have proceeded directly to step 214B.

If the transaction was not using a marked account and/or a marked device the system may log AI behavior to be observed by WTD, such as WTD 112, in step 216B. This data can then be labelled for machine learning modeling, in 218B.

If the transaction was using a marked account and/or a marked device the system may block the transaction in CAMPS, in 220B. In some embodiments, CAMPS may be used to keep track of online banking and fraudulent activity. Said fraudulent activity may be used as a rules engine for determining if the activity is fraudulent or not. The system may then determine if the account was a mule account in 222B. If so, the system may log AI behavior observed by WTD and label the data for machine learning modeling, in 216B and 218B. The system may also add said mule account to the reputation database in 224B.

For example, sometimes fraud actors will use accounts as intermediate accounts for transferring money through to other accounts. These can be considered mule accounts. In other cases, a network of accounts may be used by fraud actors to try to hide away the origin of the money which is being sent and received, using intermediate steps to move money around. The system, in some embodiments, may also detect this activity, which may involve multiple mule accounts, for example.

Data may be passed from various internal systems, such as STOPR in 226B, the scoring rule and machine learning in 228B and the transaction in CAMPS in 230B. STOPR may communicate data when updating the reputation for accounts with suspicious login in 210B.

Figure 3:
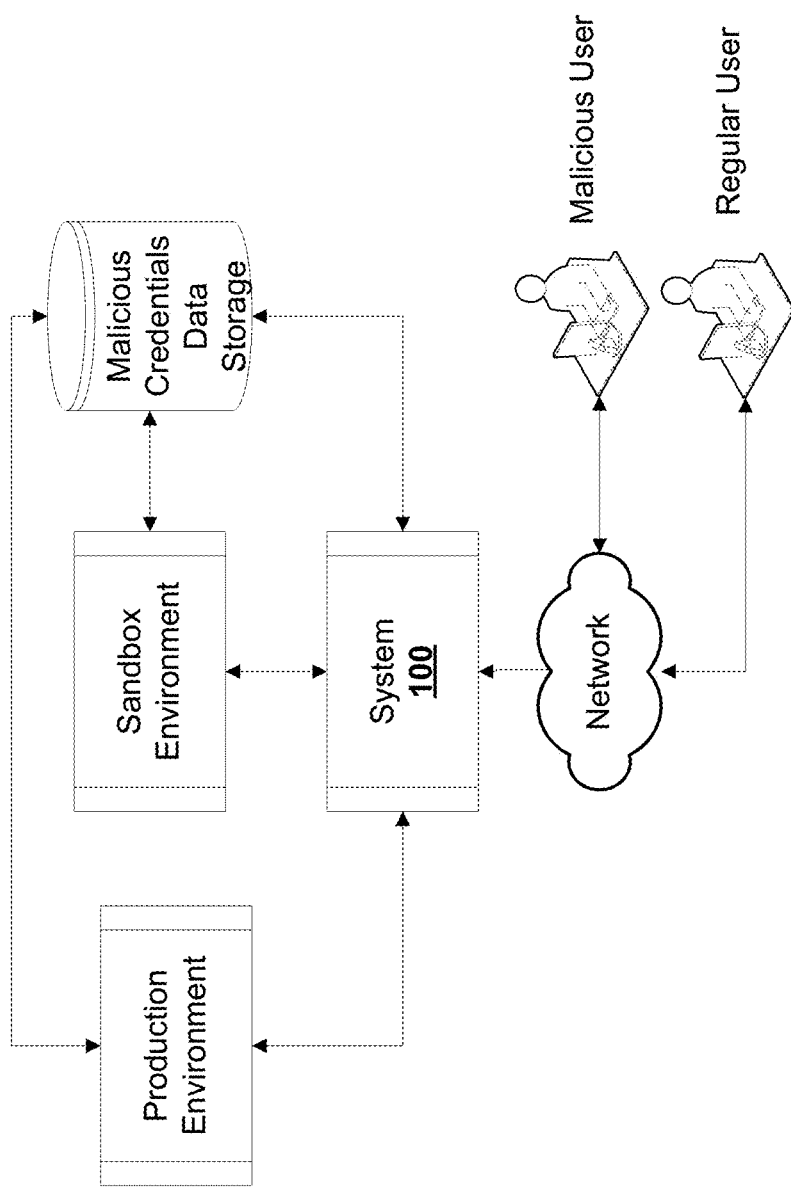
FIG. 3 is an example block schematic of a dragnet orchestrator engine, according to some embodiments.

FIG. 3 is an example block schematic of a dragnet orchestrator engine 104, according to some embodiments. In this example, a routing engine is provided by the dragnet orchestrator engine 104 to switch the session into a tracked session for the purposes of generating the malicious interaction fingerprint dataset.

As mentioned above, the malicious interaction finger print dataset can include observed features, and/or a trained machine learning model is trained (e.g., node weights are updated using the observed features). The malicious interaction fingerprint dataset and then be stored as the data structure for future analysis.

The routing engine or the dragnet orchestrator 104 can be coupled to a production environment providing an application or platform, such as an online banking system requiring login. When suspicious credentials are used, or bait credentials are used, the routing engine can direct the flow of datasets indicative of interactions to a sandbox environment operating the same application or platform. The sandbox environment, can, for example, be a non-production mirrored environment, such as a test environment, a staging environment, a development environment, etc.

The routing engine connects to the sandbox environment which can be hosted externally, and can capture submitted credentials will either be randomly client IDs (i.e., unused account credentials, not associated with actual individuals), or for OLB accounts established specifically for baiting malicious users having custom credentials. The custom credentials can allow a login in order to capture additional information about the attacker or simply show an invalid login.

Upon observing the bait credentials a software program monitoring the traffic flow between the client and web application can redirect the fraudster to a fake website hosted by the sandbox environment that has the appearance and properties of the real site which allows access to the account.

The sandbox is an environment that is specially configured for mirroring the application or platform such that the interactions appear to be seamless and similar to those of the production environment, except that the interactions with external systems, or transactions generated through the interactions are modified to increase logging/tracking aspects.

To ensure that the robotic automated nature of the system remains hidden, an anonymization layer may be used, which sits between the system and the phishing website. This layer acts as a proxy which reroutes system traffic through, for example, a Canadian household IP. This ensures that from a threat actor's point of view, traffic will be coming from personal IPs (victims) and not an automated process.

The IPs that the system uses as an anonymization layer to remain hidden may be changed from one baiting engagement to another. This is to ensure that the same IP is not used to bait multiple phishing websites, on the off chance that multiple websites may belong to the same threat actor. The baiting capability of the system may be continuously improved as new phishing kits targeting, for example, an organization, are discovered. This allows said example organisation to successfully bait the majority of the phishing sites that target the organisation. The changing of IP addresses can be conducted by changing parameters of a VPN, or as mentioned above, changing packet characteristics. In some embodiments, the residential IP addresses may be provided by a vendor, and in addition to changing IPs, the device user agent can also be changed from one baiting engagement to another. Even if there is a slim chance of using the same IP, it is not a concern with rotating user IDs, user agents, and IPs in combination. This minimizes any concern of compromise, as the IPs are all residential addresses.

A link can be established between the credentials that are used that are suspicious and events in logs (e.g., an identifier can be added as a data structure element, such as a column in a relational database), and linkages can be appended that identify other compromised accounts.

When the potentially malicious user uses the credentials to attempt to log into the system, the web traffic relating to the fraudster will be identified. The characteristics of the login attempt (e.g., as the device ID of the attacker and their IP address) will be used to create a digital identifier. This identifier will then be used to distinguish other login attempts which can be directly attributed to the potentially malicious user. The actions performed by the attacker can be recorded. If an attempt to transfer money is made, the beneficiary of the transaction will be recorded, and later, this information can be used to identify other accounts that are also attempting to send funds to the beneficiary.

For example, in the sandbox environment, when the suspicious user traverses the pages, the user experience may not shift but a backend shift may occur. When a transaction is initiated (e.g., a data message indicating a request for an electronic funds transfer), the outgoing transaction message can be automatically mined such that identifying information can be obtained (e.g., target email address for an email money transfer, a bitcoin wallet address) among others, such that the identifying information can be placed on a blacklist or a list identified for further investigation.

In some embodiments, the sandbox environment is coupled with a content generation subsystem which dynamically generates content for a fake user in the sandbox environment such that it prepopulates a fake history and a fake balance of the user. As the sandbox environment is navigated, information can be tracked relative to identifying the phishing attempt, for example, trying to determine which phishing kit was used, etc.

If correct credentials are used but in a suspicious way, a digital credential freeze could be utilized for the user and a fraud team could call the person.

In some embodiments, the sandbox environment is provided on segregated infrastructure in a separate data center decoupled from underlying financial information databases.

In some embodiments, the sandbox environment emulates the production environment, and identifiers, such as HTTP response headers, are modified such that it is more difficult for the malicious user to detect that a shift in routing to the sandbox environment.

An auto investigator may be used, capturing the data on the platform, fingerprinting a threat actor, and correlating data associated to the same attributes. For example, after the system successfully baits a phishing site, the auto investigator can be executed on a scheduled basis every two hours to proactively search the incoming traffic for the bait credentials validation attempt.

Once the bait credentials validation attempt is identified, the auto investigator can also fingerprint the threat actor's device and can attempt to find other compromised accounts targeted by the same threat actor. The auto investigator is a data process that can be run, either in batch against recorded characteristics of previous sessions, or against real-time sessions. The auto investigator can utilize, among others, the malicious interaction fingerprint datasets to conduct similarity analysis to assess and generate an estimated score that a particular session is or was conducted by the malicious actor.

By accessing the past 48 hours worth of transactions, for example, the auto investigator can try to identify access attempts by the same device fingerprint and once identified a condition of, "new device for the user, thus the user was challenged" can apply. If the condition returns as true, the account may be marked as potentially compromised.

To avoid high false positive rates, the auto investigator may drop all device fingerprints using mobile IPs as those have high volumes of traffic often resulting in high false positive rates. Given that device IDs are not as unique for mobile devices, 48 hours from credential validation provides a reasonable timeframe for a threat actor to test few accounts using the same device before rotating it.

In some embodiments, the auto investigator may be an automated script running in a scheduled manner, analyzing data in a database, based on predefined logic. This allows for scalability, and the more data in a database, the automation can scale to have no issue. The task may run longer, but this may not be a concern due to the scheduled nature of the task and no real time results are expected.

When sessions are recorded or generated with the system, these sessions may initially be established as unclassified sessions where it is unclear that session is either in on fraudulent session or fraudulent session. As interactions with the system are recorded and tracked for the particular session, and the user logs in with his or her regular credentials, the users profile may then be accessed and, in some embodiments a separate baseline user profile fingerprint dataset that is trained on at least a corpus of prior interactions by the user corresponding to the user profile can also be used alongside the malicious interaction fingerprint dataset. Similar to the malicious interaction fingerprint dataset, the separate baseline user profile fingerprint dataset can also be established using a set of features, and/or a train machine learning model is trained based off of previous interactions by the user. This is particularly useful, where the user is a very stable pattern of interactions.

A matching process can be used against all or a subset of malicious interaction fingerprint datasets and a similarity data value can be associated with a particular session to classify it as a suspicious session or not a suspicious session.

The classification, can be tracked in the form of a metadata flag a Boolean flag, among others, and when is suspicious session is flagged, the session itself and have the interactions modified such that interactions are not possible without further authentication authorization (such as an automated text validation step, or a phone validation step), or interactions may simply be terminated and the session may be noted as suspicious and the account may also be disabled. Where sessions are looked at retroactively, for example, in a batch process, transactions during that session, for example, future payments, or payments that have not yet been consummated, maybe flagged as suspicious, requiring additional verification, or simply terminated.

In a further embodiment, when additional funds are sent to an account on a production system that was a recipient of funds in any of the malicious actor fingerprint datasets, the production system may be configured to automatically enforce safeguards against the flagged account to either delay or to stop the transaction. For example, if the suspicious user sends money to a specific email address in an email money transfer that is occurring on the sandbox environment, and another user sends money to the same email address in an email money transfer that is occurring on the production environment, the transaction can be flagged, delayed, or blocked.

In another variant embodiment, the baseline user profile fingerprint dataset and its associated score can be weighted based on how stable the user's interaction has been from a consistency perspective. The system can be configured to track a similarity score across durations of time to determine whether or not the similarity score remains consistent across a particular duration of time. If the duration of time is long, a greater weight can be assigned to the contribution from the baseline user profile for dataset and its similarity score, and vice versa.

Accordingly, a spectrum of similarity can be established using the baseline user profile fingerprint dataset and the malicious interaction fingerprint dataset is opposite ends of the spectrum. In this example, the session can be established as a point along the spectrum, and in a further embodiment, the point can continually shift as more interactions are tracked for the particular session.

When the point is beyond a particular threshold, such as being 51% similar to any one of the malicious agent fingerprint datasets as compared to 49% similar to the baseline user fingerprint dataset, the session can be marked as suspicious. The amount of influence towards a particular end of the spectrum can also be used determine the type of actions taken for the particular session, for example, if similarity scores are similar, and thus in the middle the spectrum, the output may be a notification or an increased validation step. On the other hand, if the amount of influence indicates that the point is very close to anyone of the malicious agent fingerprint datasets, the output automatically may include a termination of the session, a locking of the account, and/or a termination of all transactions associated with the session.

In an embodiment, instead of automatic actions or in combination with the taking of automatic actions, a variant of system 100 may be configured to render a graphical user interface having interactive visual elements rendered on a display showing at least a graphical icon representing the spectrum and a second graphical icon representing a point along the spectrum between the baseline user fingerprint dataset and a closest malicious agent fingerprint dataset. Visual indications can be used to emphasize where, for example, a session is much more likely to be suspicious. An example could be changing a color of the graphical user element towards red if the session is more likely to suspicious as indicated by where the point lies along the spectrum.

Figure 4:
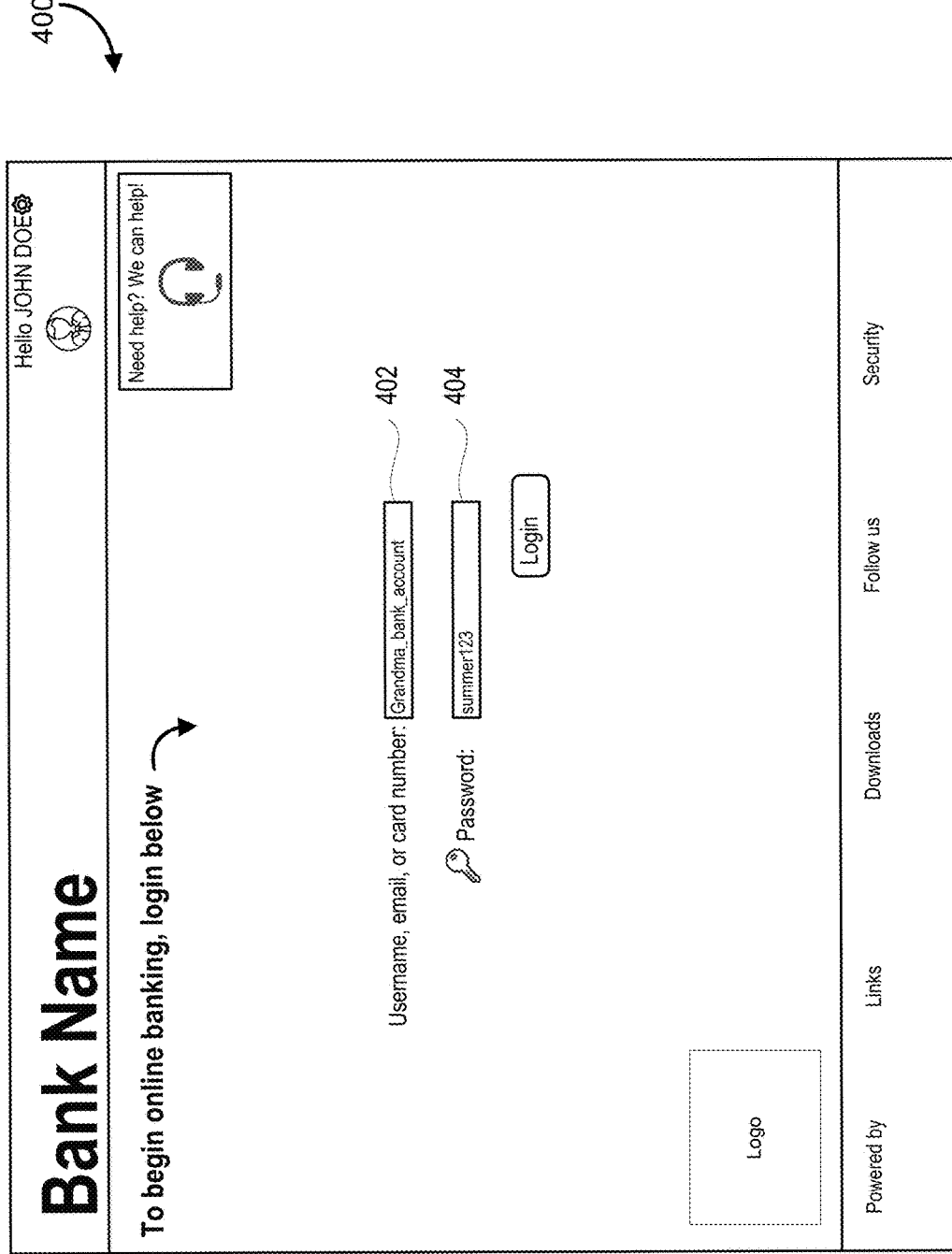
FIG. 4 is a graphical rendering of an example fraudulent login page of a phishing website, according to some embodiments.

FIG. 4 is a graphical rendering of an example fraudulent login page 400 of a phishing website, according to some embodiments.

As a non-limiting example, system 100 may receive data providing electronic identifiers for a malicious online resource, such as login page 400, adapted to fraudulently obtain user credentials. For example, a Grandma with limited technical knowledge may click on a phishing email, designed to mimic the look of her bank's communications. The login page 400 may also mimic the appearance and apparent function of the real online banking website, however it has been created to obtain Grandma's login information. System 100 can generate bait credentials to mimic such a login, creating a simulated Grandma user, herein referred to as a bait Grandma account. The website may have a logo or other graphical visual element similar to that of the legitimate website, which as mentioned above, can be automatically utilized to flag this website as a site to initiate a bait credential insertion.

The bait credentials of the bait Grandma account may include a username 402 and a simple password 404, as well as other information, such as first name, last name, province of residence, SIN number, driver's license number, account number, password, mother's maiden name, etc. System 100 may automatically traverse fraudulent webpage 400 and insert the generated bait Grandma account credentials into the input fields on webpage 400.

The fraud actor who may be running webpage 400 may now believe they have access to a victim's bank account (e.g., bait Grandma), and may attempt to use this account for various fraudulent purposes, such as using the account as a mule account to transfer funds.

The system may receive on a production instance of a secure online resource, such as the real online banking webpage, a new set of user credentials in which at least one matches that of the bait Grandma account, corresponding to the simulated Grandma user.

The validation of bait Grandma can be conducted through a checksum of her username concatenated with her password, and the system 100 then becomes triggered in respect of the malicious nature of the session.

System 100 may then route the new session to a sandbox instance of the secure online resource, such as a sandbox online banking webpage, where the interactions with the sandbox instance are recorded into a malicious interaction fingerprint dataset. The malicious interaction fingerprint dataset may include a recorded sequence of webpage traversals, a timing between actions taken through interactions with interactive webpage elements, recipients of funds transfers, mouse movements, among other information. In some embodiments, a sandbox instance may not be used and another instance could be implemented.

For example, the fraud actor may be using a bot or an automated process, which may be fingerprinted. It may go through certain pages very quickly, or may copy and paste information into input fields, such as the username or password, which will be done very fast.

The malicious fingerprint may be compared with unclassified (e.g., unidentified) interaction fingerprint datasets using a machine learning data architecture model. In this example, where a suspicious session has been rerouted, it is assumed that this is a bad actor, so the sandbox instance is used to monitor behavior of this bad actor to determine ways to flag a session as fraudulent. For instance, the system may see that the first thing the bad actor does is to check various checking accounts, add a payee, then make a transfer. The system may take many of these sandbox instances of fraudulent sessions, and using machine learning can identify what determines fraudulent activity. The online banking may be monitored through the session, where the system can observe similar behavior.

Figure 5:
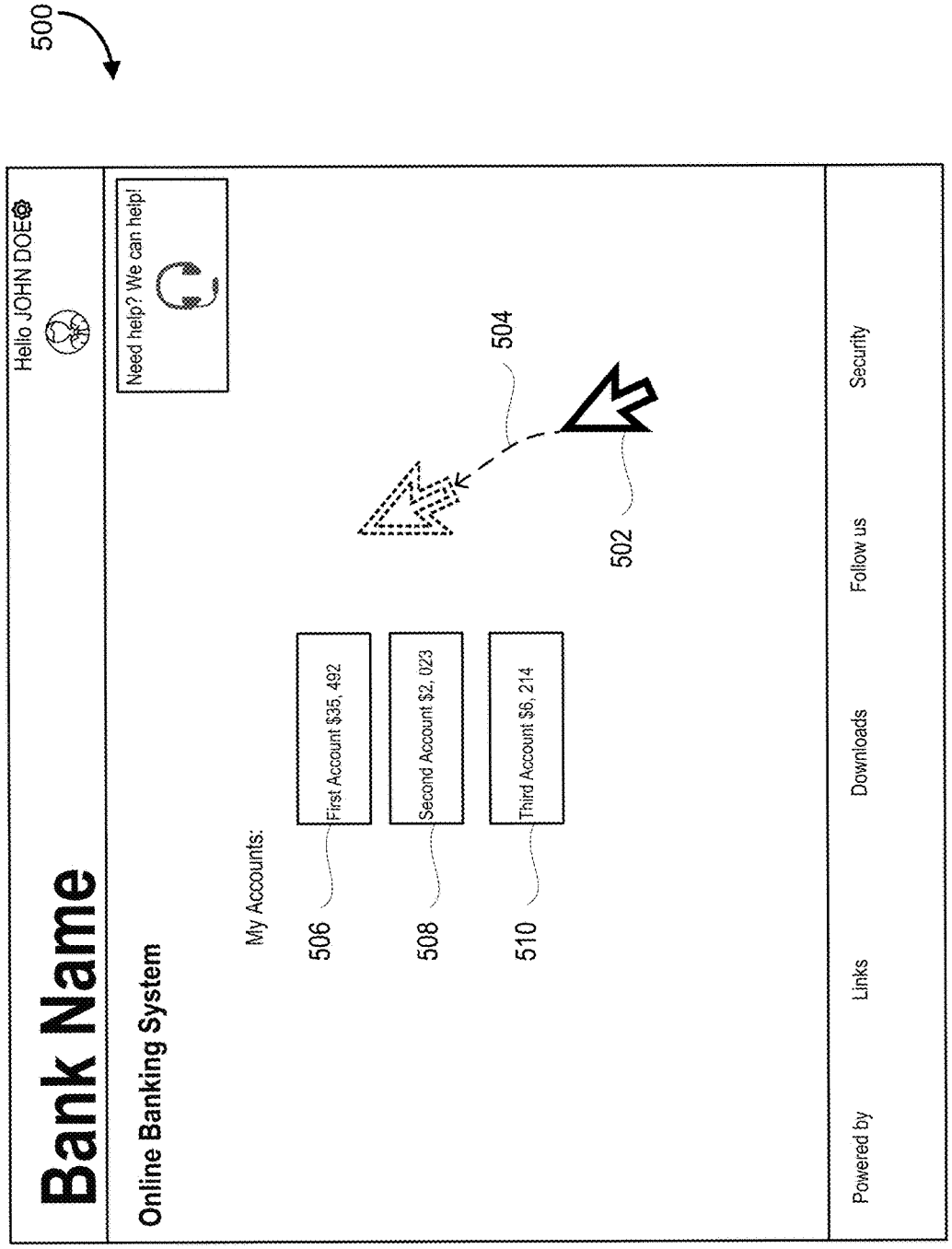
FIG. 5 is a graphical rendering of an example financial institution webpage, according to some embodiments.

FIG. 5 is a graphical rendering of an example financial institution webpage 500, according to some embodiments.

As another non limiting example, system 100 may detect fraudulent activity on a real user's account, rather than detecting the use of bait credentials as per FIG. 4. For example, had a real Grandma input her login details into fraudulent webpage 400, a fraud actor may then use these login details. Accordingly, this data process can occur at some time after the bait credentials are released into the wild and then used to fingerprint the malicious agent.

The tracked fingerprints can then be used against all sessions to identify similar usage patterns, and as noted in some variant embodiments, be tracked against a baseline to establish a spectrum of behavior analysis that can be used to automatically flag or classify a session as malicious.

The system may detect that this is not baseline behavior of real Grandma, and may identify a strong similarity to a malicious interaction fingerprint in the malicious interaction fingerprint dataset, which may include a similar sequence of webpage traversals, a similar timing between actions taken, the recipients of funds transfers, mouse movements, among other signs of malicious activity. In some embodiments, the system may use known IP addresses of bad actors to flag malicious or fraudulent activity.

In other cases, the fraud actor themselves may be logging in with the acquired real Grandma account, and the system may automatically determine that their behavior is different than the baseline or normal behavior for that particular user. For example, if the real Grandma normally only logs in after she receives her monthly pension payment, and only checks one bank account, but this new login deviates significantly, going to accounts not normally checked, the system can detect this difference from the baseline behavior of Grandma and the system may flag the activity.

For example, Grandma may usually move a mouse cursor 502 slowly, but system 100 may detect that cursor movement 504 is significantly faster than usual. Grandma may also usually only check first account 506, however the bad actor may check on first account 506, second account 508 and third account 510. All of this deviation from baseline behavior of Grandma may contribute to an increased score based on the deviation from the baseline behavior.

In some embodiments, if fraudulent activity has been detected, the system may terminate or flag all pending transactions associated with the sessions classified as being suspicious sessions. For instance, the activity described above of a bad actor logging into a real Grandma's account may be frozen to protect Grandma from potential fraud.

Baseline behavior may be tracked over a period of time for a user, and can be revisited and updated periodically. Baseline behavior may change over time, but typically will not change significantly on smaller timescales. For instance, baseline behavior may be determined over 10 years, rather than 5 days.

In some embodiments, the system may use more than one score to determine if activity is fraudulent. For example, if the system had a threshold of 1, and the detected activity had a deviation from the baseline score of 0.54, and a 0.8 relevance to a malicious fingerprint, then the system may flag the activity as fraudulent (0.54+0.8>1). In some embodiments, the system may apply different weights to different scores, and may combine the different scores in different ways to best determine and automatically detect fraudulent activity. In some embodiments, the score weights may depend on the history of the interactions.

There is always risk for false positives, and in some embodiments, the system may periodically check false positives using machine learning models, and determine what in those particular sessions could have indicated that the session was not fraudulent. This may be triggered by a person phoning in to confirm that this was their activity and not that of a bad actor, for example.

Figure 6:
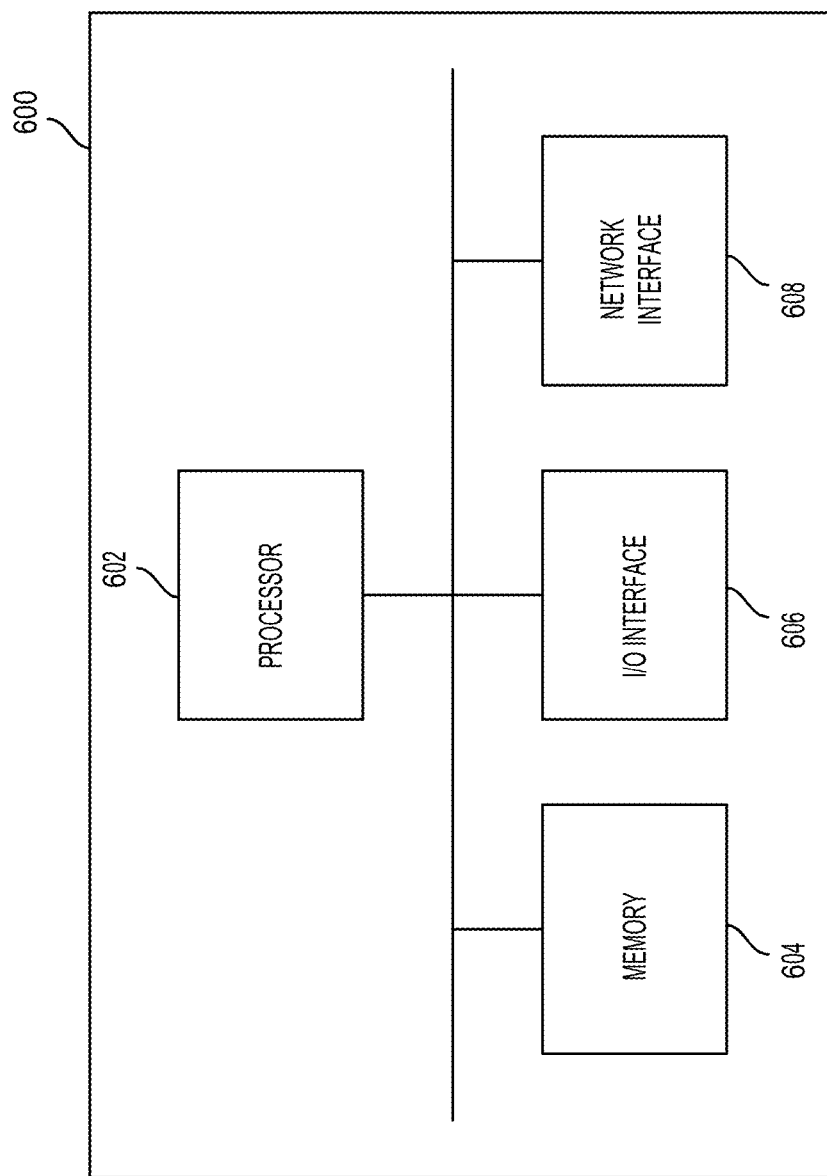
FIG. 6 is a schematic diagram of an example computing device, according to some embodiments.

FIG. 6 is a schematic diagram of a computing device 600 such as a server. As depicted, the computing device includes at least one processor 602, memory 604, at least one I/O interface 606, and at least one network interface 608.

Processor 602 may be an Intel or AMD x86 or x64, PowerPC, ARM processor, or the like. Memory 604 may include a suitable combination of computer memory that is located either internally or externally such as, for example, random-access memory (RAM), read-only memory (ROM), compact disc read-only memory (CDROM), or the like.

Each I/O interface 606 enables computing device 600 to interconnect with one or more input devices, such as a keyboard, mouse, camera, touch screen and a microphone, or with one or more output devices such as a display screen and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combinations of these.

Computing device 600 is operable to register and authenticate users (using a login, unique identifier, and password for example) prior to providing access to applications, a local network, network resources, other networks and network security devices. Computing devices 600 may serve one user or multiple users.

Figure 7:
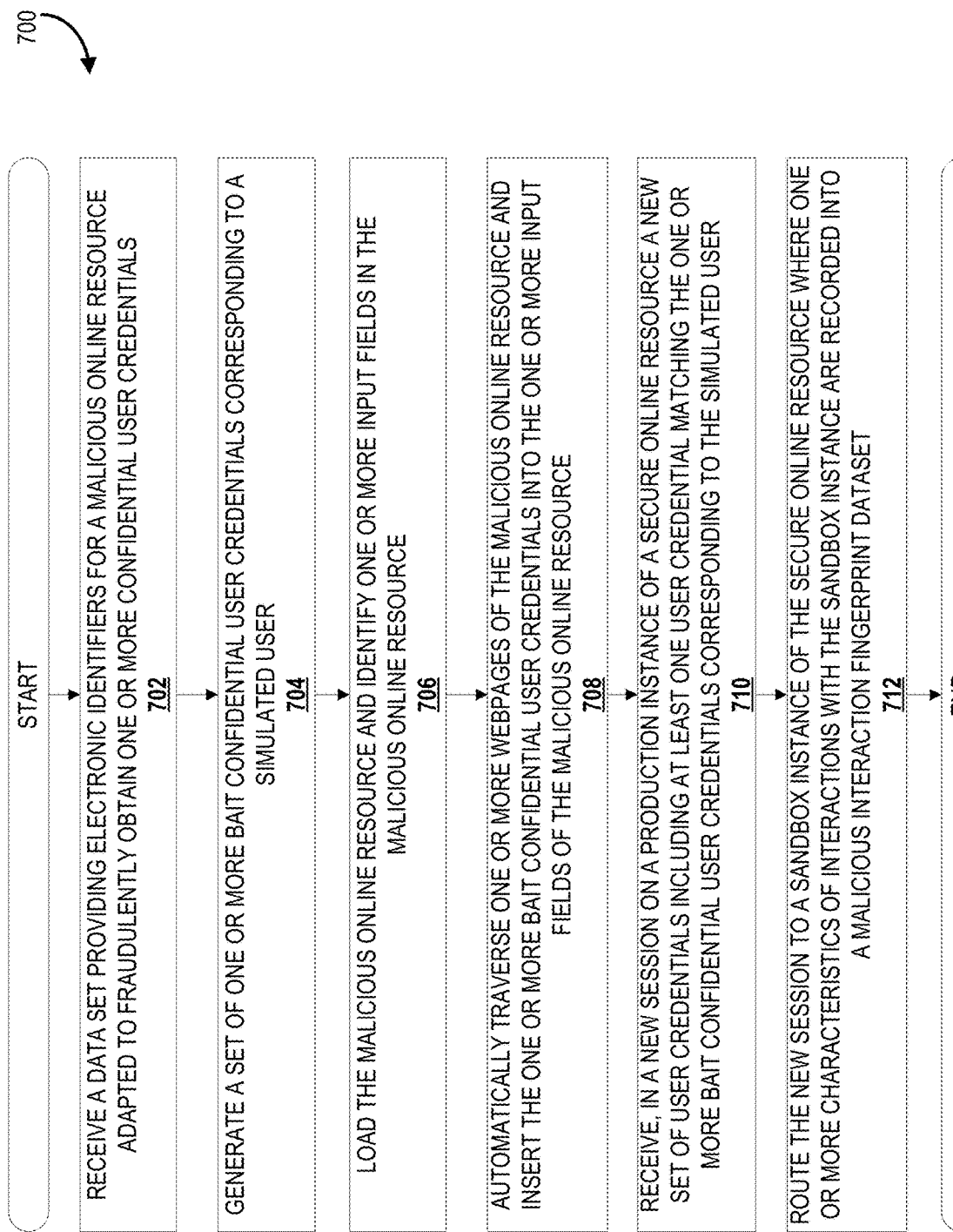
FIG. 7 is an exemplary method of automatically detecting and reducing the effectiveness of fraudulent activity, according to some embodiments.

FIG. 7 is an exemplary method 700 of automatically detecting and reducing the effectiveness of fraudulent activity, according to some embodiments. The steps are shown as examples and alternate, different examples are possible.

Step 702 includes receiving a dataset providing electronic identifiers for a malicious online resource adapted to fraudulently obtain one or more confidential user credentials.

Step 704 includes generating a set of one or more bait confidential user credentials corresponding to a simulated user.

Step 706 includes loading the malicious online resource and identifying one or more input fields in the malicious online resource.

Step 708 includes automatically traversing one or more webpages of the malicious online resource and inserting the one or more bait confidential user credentials into the one or more input fields of the malicious online resource.

Step 710 includes receiving, in a new session on a production instance of a secure online resource a new set of user credentials including at least one user credential matching the one or more bait confidential user credentials corresponding to the simulated user.

Step 712 includes routing the new session to a sandbox instance of the secure online resource where one or more characteristics of interactions with the sandbox instance are recorded into a malicious interaction fingerprint dataset.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for automated interaction with malicious computing agents, the computer system comprising:
   a processor coupled to computer memory and non-transitory computer readable media, the processor configured to:
   generate a set of one or more bait confidential user credentials corresponding to a simulated user;
   load a malicious online resource that is configured to fraudulently obtain one or more confidential user credentials and identify one or more input fields in the malicious online resource;
   automatically traverse one or more webpages of the malicious online resource and insert the one or more bait confidential user credentials into the one or more input fields of the malicious online resource;
   receive, in a new session on a production instance of a secure online resource, a new set of user credentials requesting access to the secure online resource;
   responsive to the new set of user credentials including at least one user credential matching the one or more bait confidential user credentials corresponding to the simulated user, flag the new session as a malicious actor session;
   route the malicious actor session to a sandbox instance of the secure online resource where one or more characteristics of interactions with the sandbox instance are recorded into a malicious interaction fingerprint dataset;
   generate, during one or more unclassified sessions of the secure online resource, corresponding one or more unclassified interaction fingerprint datasets, the one or more unclassified interaction fingerprint datasets each representative of recorded characteristics of interactions;
   determine, for each of the one or more unclassified sessions, a corresponding malicious actor similarity data value by comparing each of the one or more unclassified interaction fingerprint datasets against the malicious interaction fingerprint dataset;
   retrieve, for each of the one or more unclassified sessions, a baseline user profile fingerprint dataset trained based at least on a corpus of prior interactions by a user;
   determine, for each of the one or more unclassified sessions, a corresponding baseline similarity data value by comparing each of the one or more unclassified interaction fingerprint datasets against the baseline user profile fingerprint fingerprint dataset; and
   classify one or more sessions of the one or more unclassified sessions as a suspicious session based upon a weighted combination of the corresponding baseline similarity data value and the corresponding malicious actor similarity data value.

2. The computer system of claim 1, wherein the set of the one or more bait confidential user credentials include at least a bait client card number, a bait username, a bait password, a bait address, and a bait contact information; and wherein the bait client card number is generated with a bait checksum such that the bait client card number is verifiable using the bait checksum when received in the new set of user credentials.

3. The computer system of claim 2, wherein the processor is configured to first establish a state or a province of the set of the bait confidential user credentials selected based on a probability that is proportional of a population of the state or the province relative to a population of a corresponding country to which the state or the province is within, and then using the state or the province, generate the bait address or the bait contact information.

4. The computer system of claim 3, wherein the set of the one or more bait confidential user credentials is associated with an internet protocol (IP) address generated to replicate a residential device originating communications from the state or the province, and the internet protocol (IP) address is mimicked for the automatic traversal of the one or more webpages of the malicious online resource.

5. The computer system of claim 4, wherein the internet protocol (IP) address generated is unique per set of the one or more bait confidential user credentials such that where a malicious actor is controlling a set of malicious online resources, a same internet protocol (IP) address will not be used across more than one malicious resource of the set of malicious online resources.

6. The computer system of claim 1,
   wherein the determination, for each of the one or more unclassified sessions, of the corresponding malicious actor similarity data value includes using a 1:n matching attempt, where n is a full set of all available malicious interaction fingerprint data sets.

7. The computer system of claim 6,
   wherein a first 1:m matching attempt is conducted prior the 1:n matching attempt, wherein m is a set of all recent malicious interaction fingerprint data sets, and if a match is found using the 1:m matching attempt, the determination is concluded.

8. The computer system of claim 6, wherein the malicious interaction fingerprint dataset includes at least one of a recorded sequence of webpage traversals, recorded input device inputs, recorded timing intervals between interactions with interactive web page elements, addresses or recipients of funds transfers.

9. The computer system of claim 6, wherein the malicious interaction fingerprint dataset is compared with the one or more unclassified interaction fingerprint datasets using a machine learning data architecture model.

10. The computer system of claim 6, wherein the one or more unclassified sessions are on-going, and wherein the processor is further configured to: close or invoke an updated challenge on all sessions of the one or more unclassified sessions classified as suspicious sessions; or wherein the one or more unclassified sessions have concluded, and wherein the processor is further configured to:

terminate or flag all pending transactions associated with the sessions of the one or more unclassified sessions classified as suspicious sessions.

11. A computer implemented method for automated interaction with malicious computing agents, the computer method comprising:
generating a set of one or more bait confidential user credentials corresponding to a simulated user;
loading a malicious online resource that is configured to fraudulently obtain one or more confidential user credentials and identify one or more input fields in the malicious online resource;
automatically traversing one or more webpages of the malicious online resource and inserting the one or more bait confidential user credentials into the one or more input fields of the malicious online resource;
receiving, in a new session on a production instance of a secure online resource, a new set of user credentials requesting access to the secure online resource;
responsive to the new set of user credentials including at least one user credential matching the one or more bait confidential user credentials corresponding to the simulated user, flagging the new session as a malicious actor session;
routing the malicious actor session to a sandbox instance of the secure online resource where one or more characteristics of interactions with the sandbox instance are recorded into a malicious interaction fingerprint dataset;
generating, during one or more unclassified sessions of the secure online resource, corresponding one or more unclassified interaction fingerprint datasets, the one or more unclassified interaction fingerprint datasets each representative of recorded characteristics of interactions;
determining, for each of the one or more unclassified sessions, a corresponding malicious actor similarity data value by comparing each of the one or more unclassified interaction fingerprint datasets against the malicious interaction fingerprint dataset;
retrieving, for each of the one or more unclassified sessions, a baseline user profile fingerprint dataset trained based at least on a corpus of prior interactions by a user;
determining, for each of the one or more unclassified sessions, a corresponding baseline similarity data value by comparing each of the one or more unclassified interaction fingerprint datasets against the baseline user profile fingerprint fingerprint dataset; and
classifying one or more sessions of the one or more unclassified sessions as a suspicious session based upon a weighted combination of the corresponding baseline similarity data value and the corresponding malicious actor similarity data value.

12. The computer implemented method of claim 11, wherein the set of the one or more bait confidential user credentials include at least a bait client card number, a bait username, a bait password, a bait address, and a bait contact information; and wherein the bait client card number is generated with a bait checksum such that the bait client card number is verifiable using the bait checksum when received in the new set of user credentials.

13. The computer implemented method of claim 12, comprising: establishing a state or a province of the set of the bait confidential user credentials selected based on a probability that is proportional of a population of the state or the province relative to a population of a corresponding country to which the state or the province is within, and then using the state or the province, generate the bait address or the bait contact information.

14. The computer implemented method of claim 13, wherein the set of the one or more bait confidential user credentials is associated with an internet protocol (IP) address generated to replicate a residential device originating communications from the state or the province, and the internet protocol (IP) address is mimicked for the automatic traversal of the one or more webpages of the malicious online resource.

15. The computer implemented method of claim 14, wherein the internet protocol (IP) address generated is unique per set of the one or more bait confidential user credentials such that where a malicious actor is controlling a set of malicious online resources, a same internet protocol (IP) address will not be used across more than one malicious resource of the set of malicious online resources.

16. The computer implemented method of claim 11, wherein the determining, for each of the one or more unclassified sessions, of the corresponding malicious actor similarity data value includes using a 1:n matching attempt, where n is a full set of all available malicious interaction fingerprint data sets.

17. The computer implemented method of claim 16, wherein a first 1:m matching attempt is conducted prior the 1:n matching attempt, wherein m is a set of all recent malicious interaction fingerprint data sets, and if a match is found using the 1:m matching attempt, the determination is concluded.

18. The computer implemented method of claim 16, wherein the malicious interaction fingerprint dataset includes at least one of a recorded sequence of webpage traversals, recorded input device inputs, recorded timing intervals between interactions with interactive web page elements, addresses or recipients of funds transfers.

19. The computer implemented method of claim 16, wherein the malicious interaction fingerprint dataset is compared with the one or more unclassified interaction fingerprint datasets using a machine learning data architecture model.

20. A non-transitory computer readable medium storing machine interpretable instructions which when executed by a processor, cause the processor to perform a computer implemented method for automated interaction with malicious computing agents, the computer method comprising:
generating a set of one or more bait confidential user credentials corresponding to a simulated user;
loading a malicious online resource that is configured to fraudulently obtain one or more confidential user credentials and identify one or more input fields in the malicious online resource;
automatically traversing one or more webpages of the malicious online resource and inserting the one or more bait confidential user credentials into the one or more input fields of the malicious online resource;
receiving, in a new session on a production instance of a secure online resource, a new set of user credentials requesting access to the secure online resource;
responsive to the new set of user credentials including at least one user credential matching the one or more bait confidential user credentials corresponding to the simulated user, flagging the new session as a malicious actor session;
routing the malicious actor session to a sandbox instance of the secure online resource where one or more characteristics of interactions with the sandbox instance are recorded into a malicious interaction fingerprint dataset;

generating, during one or more unclassified sessions of the secure online resource, corresponding one or more unclassified interaction fingerprint datasets, the one or more unclassified interaction fingerprint datasets each representative of recorded characteristics of interactions;

determining, for each of the one or more unclassified sessions, a corresponding malicious actor similarity data value by comparing each of the one or more unclassified interaction fingerprint datasets against the malicious interaction fingerprint dataset;

retrieving, for each of the one or more unclassified sessions, a baseline user profile fingerprint dataset trained based at least on a corpus of prior interactions by a user;

determining, for each of the one or more unclassified sessions, a corresponding baseline similarity data value by comparing each of the one or more unclassified interaction fingerprint datasets against the baseline user profile fingerprint fingerprint dataset; and classifying one or more sessions of the one or more unclassified sessions as a suspicious session based upon a weighted combination of the corresponding baseline similarity data value and the corresponding malicious actor similarity data value.

* * * * *

UNITED STATES PATENT AND TRADEMARK OFFICE
CERTIFICATE OF CORRECTION

PATENT NO. : 11,722,520 B2
APPLICATION NO. : 17/101713
DATED : August 8, 2023
INVENTOR(S) : Matin Hallaji et al.

It is certified that error appears in the above-identified patent and that said Letters Patent is hereby corrected as shown below:

In the Claims

Column 24 Lines 1 - 2 (Claim 1): "... interaction fingerprint datasets against the baseline user profile fingerprint fingerprint dataset;"
Should read: -- ... interaction fingerprint datasets against the baseline user profile fingerprint dataset; --

Column 25 Lines 48 - 49 (Claim 11): "... interaction fingerprint datasets against the baseline user profile fingerprint fingerprint dataset;"
Should read: -- ... interaction fingerprint datasets against the baseline user profile fingerprint dataset; --

Column 27 Lines 22 - 23 (Claim 20): "... interaction fingerprint datasets against the baseline user profile fingerprint fingerprint dataset;"
Should read: -- ... interaction fingerprint datasets against the baseline user profile fingerprint dataset; --

Signed and Sealed this
Fourth Day of February, 2025

Coke Morgan Stewart
*Acting Director of the United States Patent and Trademark Office*